United States Patent

Dulhunty

[15] 3,644,660
[45] Feb. 22, 1972

[54] OVERHEAD TRANSMISSION LINE AND ATTACHED VIBRATION DAMPER

[72] Inventor: Philip W. Dulhunty, Sefton, New South Wales, Australia

[73] Assignee: Dulmison (Australia) Pty. Limited, Sefton, New South Wales, Australia

[22] Filed: July 9, 1970

[21] Appl. No.: 53,619

[30] Foreign Application Priority Data

July 14, 1969 Australia ..........................57,930/69

[52] U.S. Cl. ..............................174/42, 174/DIG. 12, 248/61
[51] Int. Cl. ........................................................H02g 7/14
[58] Field of Search..................174/41, 42, 160, 170, 173, 174/DIG. 12; 248/58, 61, 63

[56] References Cited

UNITED STATES PATENTS

| | | | |
|---|---|---|---|
| 311,523 | 2/1885 | Patterson | 248/61 |
| 2,058,173 | 10/1936 | Noyes et al. | 174/42 |
| 2,959,632 | 11/1960 | Peterson | 174/DIG. 12 |
| 3,076,865 | 2/1963 | Volk et al. | 174/173 X |
| 3,327,048 | 6/1967 | Haro | 174/42 |
| 3,463,870 | 8/1969 | Eucker | 174/42 |

*Primary Examiner*—Laramie E. Askin
*Attorney*—Stevens, Davis, Miller & Mosher

[57] ABSTRACT

A vibration damper for an overhead cable having a C-shaped cushioned elastomer lined suspender engaging the cable and a vibration damper suspended below it. Helical rods are wrapped around the cable and suspender to hold the suspender in place.

4 Claims, 6 Drawing Figures

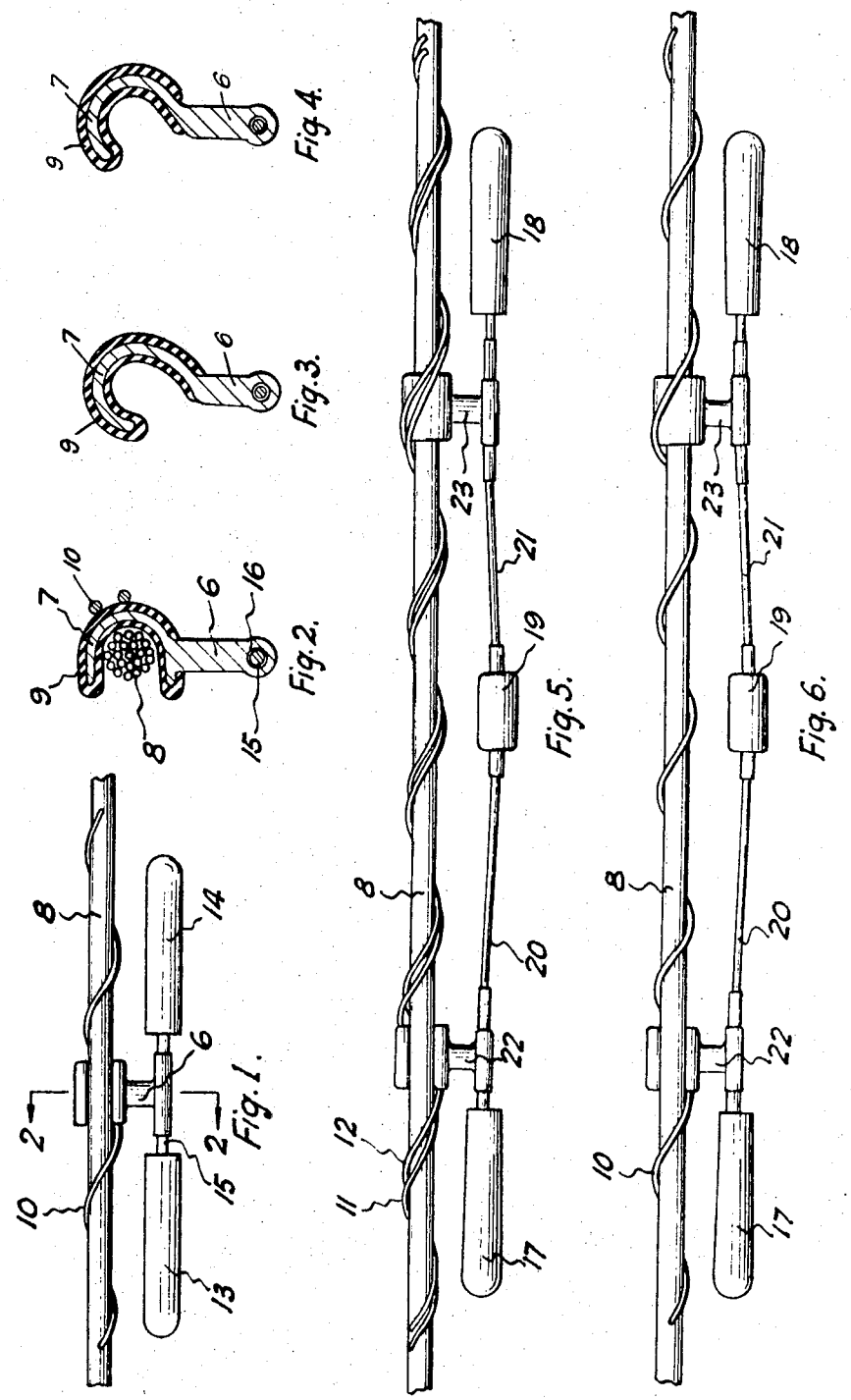

OVERHEAD TRANSMISSION LINE AND ATTACHED VIBRATION DAMPER

This invention relates to vibration dampers of the type which are suspended at intervals from overhead cables to reduce vibration generated therein mainly by external natural causes.

More particularly, the invention has been devised for use with vibration dampers intended to be secured to overhead multistrand cables in electricity reticulation systems.

Some known vibration dampers adopted in such systems have tended to injure the cable to which they were affixed, by virtue of the fact that they relied on tightly fitting clamps to secure them to the cable. When the bolts in such clamps are being tightened, severe compressive forces are applied to overlying strands in the cable, and such forces tend to crush and sometimes actually dent the strands within the clamp.

It is known that in multistrand aluminum cables "cold flow" occurs, and the individual strands tend to creep. These factors sometimes cause the bolted clamps to work loose, and particularly during lengthy phases of severe vibration they can be responsible for causing fatigued strands of the cable to rupture within or adjacent to the vibrator.

The present invention aims at eliminating or at least substantially reducing the effect of such known disadvantages.

Broadly, the present invention consists in the combination with at least one suspender, adapted to be hooked onto an overhead cable to support a vibration damper, of one or more helical rods adapted to surround said cable and secure said suspender thereto, a hooked portion of said suspender being coated with an elastomer to provide cushioning means between said suspender and said cable.

Certain embodiments of the invention will now be described herein with reference to the accompanying drawings in which similar references indicate corresponding parts and in which:

FIG. 1 shows, in front elevation, a double-mass type vibration damper supported from a cable by means of a suspender held by a single-helical rod, FIG. 2 shows, in side elevation and partly in section, a view along the line 2—2 of Figure 1, FIGS 3 and 4 show respective modifications of the arrangement shown in FIG. 2, FIG. 5 shows a triple-mass type vibration damper suspended from a cable by means of a pair of suspenders held by a pair of helical rods, and FIG. 6 shows a similar device using a single helical rod.

Upon referring to the drawings it will be seen that a suspender 6 has its hooked portion 7 so shaped that it may be introduced to the cable 8 laterally. Alternatively, said hooked portion may be shaped so that it would be introduced to the cable vertically, or at an angle with the vertical as shown in Figures 3 and 4. In other words, the mouth of the hooked portion may be disposed horizontally, vertically, or an an appropriate angle. The before-mentioned elastomer is used to form the sheath 9 on the hooked portion 7, and may be rubber, Neoprene Nordel or other known type of readily flexible substance.

The helical rod 10 or the rods 11 and 12 may be wrapped around the cable 8 at one side of each suspender such as 6, then around the clamping or rear or blind portion of the suspender, and finally around the cable at the other side of said suspender.

A vibration damper consisting of a first mass 13 and a second mass 14 connected as shown by the resilient member 15 composed, for example, of stranded steel wire, is supported from the cable 8 by said member through a journal 16 in suspender 6. In a modification of the invention shown in Figures 5 and 6 said vibration damper may consist of a pair of masses 17 and 18 and an intermediate mass 19 connected as shown by the resilient members 20 and 21 (which apart from their lengths are similar to the resilient member 15) supported from the cable 8 by means of a pair of suspenders 22 and 23 (the latter being identical with suspender 6 but reversed upon the cable 8 in adjacent pairs as shown in Figures 5 and 6).

In accordance with the invention the clamping portion of each said suspender provides a wide distribution of stresses, and, through the medium of the elastomer, high frequency vibrations are also absorbed.

Furthermore, it is known that a secondary damping effect is achieved by virtue of the stiffness of the rods 10 (or the rods 11 and 12 as the case may be). Thus, to achieve additional damping it is merely necessary to add further helical rods which may, for example, be sprung over the cable 8 in a colinear arrangement or simply laid side by side with the existing rod or rods either in a continuous length or in separate discrete lengths.

I claim:
1. A vibration damper and transmission line comprising:
   a. a resilient supporting member extending substantially parallel with said transmission line with a mass at each end of said supporting member;
   b. suspender attaching said member to said transmission line with a U-shaped opening engaging said line, said opening being at an angle to the vertical;
   c. a resilient elastomer coating inside said U-shaped opening to cushion it against said line;
   d. at least one helical rod wrapped around said line and the portion of the suspender opposite said U-shaped opening.
2. The damper of claim 1 in which said helical rod extends along the line and both sides of said suspender.
3. The damper of claim 1 in which the suspender has a journal through which the resilient member passes.
4. The damper of claim 1 in which said elastomer is selected from the group consisting of natural or synthetic rubber or neoprene.

* * * * *